(12) United States Patent
Camille Cotteverte et al.

(10) Patent No.: US 7,596,156 B2
(45) Date of Patent: Sep. 29, 2009

(54) LASER

(75) Inventors: Jean-Charles Joseph Camille Cotteverte, Montreal (CA); Jevgenij Kosenko, Montreal (CA); Roman Rus, St.-Leonard (CA)

(73) Assignee: XYZ Imaging, Inc., a Canadian Company, Montreal Quebec (CA)

( * ) Notice: Subject to any disclaimer, the term of this patent is extended or adjusted under 35 U.S.C. 154(b) by 724 days.

(21) Appl. No.: 11/079,630

(22) Filed: Mar. 14, 2005

(65) Prior Publication Data

US 2005/0201428 A1 Sep. 15, 2005

(30) Foreign Application Priority Data

Mar. 12, 2004 (GB) ................. 0405554.7

(51) Int. Cl.
*H01S 3/10* (2006.01)
*H01S 3/13* (2006.01)

(52) U.S. Cl. .................... 372/26; 372/29.02

(58) Field of Classification Search ............ 372/26, 372/29.02, 29.022, 34, 92
See application file for complete search history.

(56) References Cited

U.S. PATENT DOCUMENTS

| | | | |
|---|---|---|---|
| 3,436,678 A | 4/1969 | Sharp et al. ............. 331/94.5 |
| 3,534,289 A | 10/1970 | Clark et al. ............. 331/94.5 |
| 3,628,173 A * | 12/1971 | Danielmeyer .............. 372/20 |
| 3,676,799 A | 7/1972 | Danielmeyer .............. 331/94.5 |
| 3,764,936 A * | 10/1973 | Baues ....................... 372/30 |
| 5,392,303 A * | 2/1995 | Shiozawa et al. ............. 372/32 |
| 5,412,673 A | 5/1995 | Caprara et al. ............. 372/19 |
| 7,003,004 B2 * | 2/2006 | Rodin et al. ................ 372/23 |
| 2002/0009108 A1 | 1/2002 | Kopylow et al. ......... 372/38.01 |
| 2003/0016709 A1 * | 1/2003 | Flanders .................... 372/26 |

FOREIGN PATENT DOCUMENTS

EP 1394634 A2 3/2004
WO WO2005088785 9/2005

OTHER PUBLICATIONS

Salomon et al.; *Laser stabilization at the millihertz level*, J. Opt. Soc. Am. B, vol. 5, No. 8, Aug. 1988, pp. 1576-1587, 5 Figs., 1 Table.
Weel et al.; *Laser-frequency stabilization using a lock-in amplifier*, Can. J. Phys. vol. 80, (2002) pp. 1449-1458, 9 Figs.
R. W. P. Drever et al.; *Laser Phase and Frequency Stabilization Using an Optical Resonator*, Applied Physics B, vol. 31, 1983, pp. 97-105, 7 Figs.
T. W. Hänsch et al., *High-Resolution Saturation Spectroscopy of the Sodium D Lines with a Pulsed Tunable Dye Laser*, Physical Review Letters, vol. 27, No. 11, Sep. 13, 1971, pp. 707-710, 4 Figs.

* cited by examiner

*Primary Examiner*—Armando Rodriguez
(74) *Attorney, Agent, or Firm*—Madan & Sriram, P.C.

(57) ABSTRACT

A method of stabilising a laser in order to maintain the laser in SLM operation is disclosed. The resonator cavity of the laser is modulated by a modulation signal applied to a piezo-electric transducer 10 coupled to the output coupler 2 of the laser. The modulation signal is also multiplied by a signal indicative of the energy of the laser radiation within the resonator cavity. The product of these two signals is then low-pass filtered to provide an error signal which is additionally applied to the piezo-electric transducer 10 so as to further vary the optical length of the resonator cavity.

39 Claims, 6 Drawing Sheets

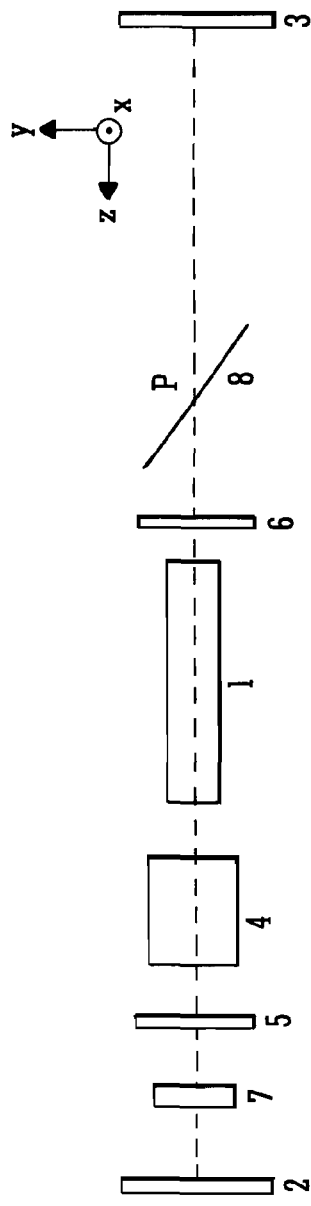
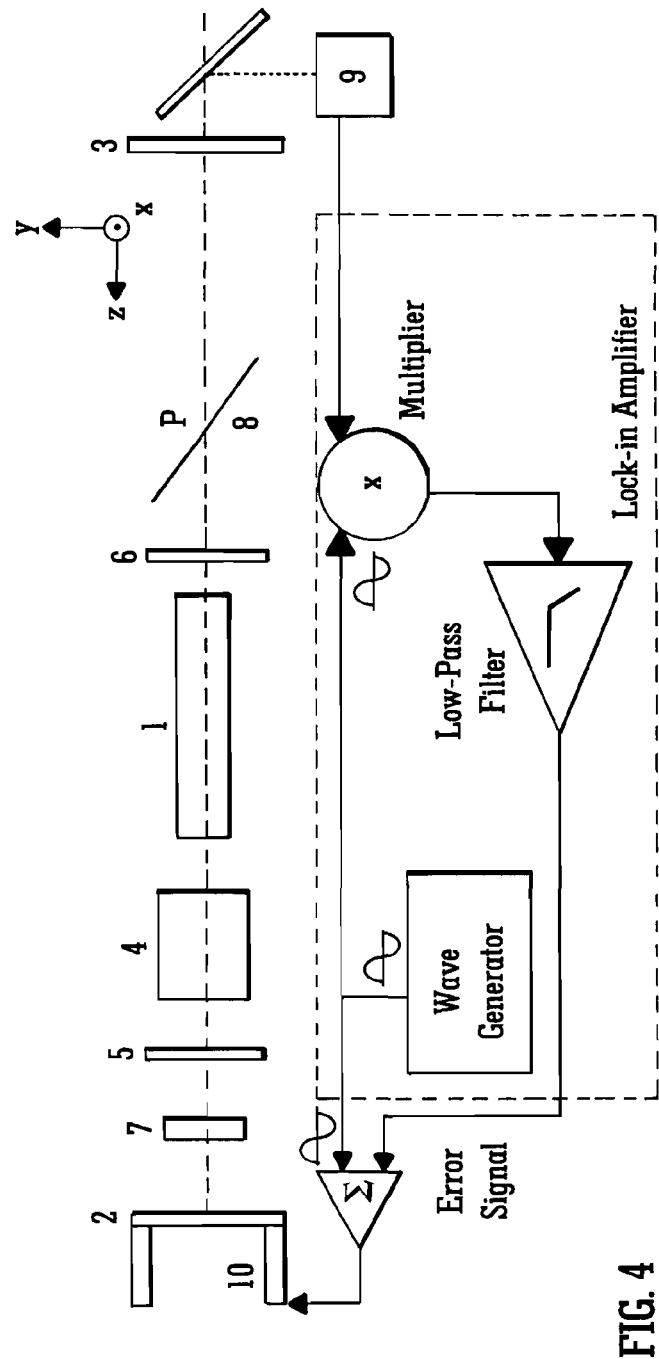
FIG. 3
FIG. 4

LASER

CROSS-REFERENCE TO RELATED APPLICATIONS

This application relates to and claims priority from U.K. application GB 0405554.7 for "A LASER", filed on Mar. 12, 2004, the entire contents of which are hereby incorporated herein by reference.

BACKGROUND OF THE INVENTION

1. Field of the Invention

The present invention relates to a laser and a method of stabilising a laser. The preferred embodiment relates to a method of stabilizing the energy of a pulsed SLM solid-state laser using a modulation technique.

2. Description of the Related Art

For certain holographic applications it is desirable to be able to use a red, green and blue (RGB) laser to write holographic pixels of a colour hologram. In order to ensure a good interference between the object and reference beams which are used to write the holographic pixels, the coherence length between the two beams should preferably be longer than the path difference of the two beams. As a result, in order to have a suitably long coherence length, it is highly desirable that the laser used in such applications should operate in a single longitudinal mode (SLM). In order to ensure that the laser operates in a SLM an etalon may be provided within the resonator cavity.

As will be understood by those skilled in the art, over time ambient temperature changes will effectively alter the optical length of the laser or resonator cavity even though the laser or resonator cavity may be mounted on super-invar bars. Typically, the drift due to changes in the air temperature is approximately 300 MHz/° C. and the drift to changes in the laser cooling water temperature is approximately 600 MHz/° C. The Free Spectral Range ("FSR") of a laser is typically approximately 180 MHz and hence as will be understood by those skilled in the art and as will be made apparent in the following description, the laser only needs to drift by approximately half of the FSR (i.e. approximately 90 MHz) for the laser to change from operating in SLM to operating in a dual lasing mode. This represents a temperature change of only approximately 0.1° C. The output of the laser will therefore begin to drift in frequency over a period of time. In particular, the relative laser frequency will begin to vary with respect to the resonance frequency of the etalon.

FIGS. 1A and 1B show the typical pulse energy and the transmission of an etalon as the frequency drifts. It will be understood by those skilled in the art that because of the intrinsic transmission of the etalon (Airy function with peaks at resonances) the laser losses will also vary with respect to the laser frequency relative to the etalon resonance frequency. The laser may not therefore always be in SLM which can be particularly disadvantageous especially in certain applications such as holography. The simultaneous oscillation of two longitudinal modes will therefore occur when these two modes undergo substantially the same losses.

FIG. 2A shows a mode of operation wherein one longitudinal mode is clearly less lossy than other modes and hence the laser will operate in SLM. FIG. 2B shows the situation when two longitudinal modes experience substantially the same losses. In this situation, both laser modes will oscillate substantially simultaneously and hence the laser will no longer operate in the desired SLM mode of operation. The optical length of the laser is equal to $q\lambda/2$, wherein q is the longitudinal index of the operating mode.

In order to keep the laser operating in a SLM the laser needs to be stabilised. However, measuring the absolute value of the laser frequency in order to stabilise the laser is largely impractical for various reasons.

It is known to introduce a defect or a marker into the energy profile of a laser in order to assist in stabilising the laser. For example, in inhomogeneously-broadened gas lasers the Lamp dip may be used as a marker of the line center if it is deep enough. If not, then the gain curve itself may be used.

It is also known to introduce a saturable absorber inside a laser cavity and to use it as a reference. The saturable absorber is resonant at the operating wavelength. The defect in the profile is then a peak whose bandwidth is normally narrower (i.e. more accurate for modulation) than the Lamb dip.

However, it is generally disadvantageous to have to introduce a defect or marker into the energy profile of a laser, especially a solid state laser. Moreover, the broadening in a solid state laser is homogeneous.

It is therefore desired to stabilise the energy of a laser, especially a solid state laser, without needing to introduce a defect or marker and without, for example, having to provide a special cell including a saturable absorber.

SUMMARY OF THE INVENTION

According to an aspect of the present invention there is provided a laser comprising:

a laser or resonator cavity;

one or more etalons located within the laser or resonator cavity; and one or more devices for modulating and/or varying the optical length of the laser or resonator cavity;

wherein, in use, a first modulation signal and a second error signal are applied or supplied to the one or more devices in order to modulate and/or vary the optical length of the laser or resonator cavity.

The laser preferably further comprises signal generating means for generating the first modulation signal, wherein the first modulation signal is applied or supplied, in use, to the one or more devices in order to modulate the optical length of the laser or resonator cavity. The first signal generating means may comprise an AC or RF voltage source or voltage wave generator or the first modulation signal may be provided digitally by a computer or microprocessor.

The laser preferably further comprises error signal generating means for generating the second error signal, wherein the second error signal is applied or supplied, in use, to the one or more devices in order to vary the optical length of the laser or resonator cavity. The error signal generating means may comprise an analogue or digital device.

According to the preferred embodiment the one or more etalons are preferably arranged so as to select or to encourage the laser to operate in a single longitudinal mode.

The laser or resonator cavity preferably comprises a linear laser or resonator cavity, although less preferably the laser or resonator cavity may comprise a ring laser or resonator cavity.

The laser or resonator cavity preferably comprises at least one output coupler. At least one of the devices for modulating and/or varying the optical length of the laser or resonator cavity is preferably arranged to translate, modulate or vary the at least one output coupler.

The laser or resonator cavity preferably comprises at least one rear mirror. At least one of the devices for modulating and/or varying the optical length of the laser or resonator cavity is preferably arranged to translate, modulate or vary the at least one rear mirror.

The one or more devices for modulating and/or varying the optical length of the laser or resonator cavity preferably comprises one or more piezo-electric transducers or devices or one or more piezo-ceramic transducers or devices.

A detector is preferably provided for detecting or determining the energy of laser radiation within the laser or resonator cavity, the detector being arranged to output a third signal. The laser preferably comprises an output coupler and/or a rear mirror, and the detector is preferably arranged to detect one or more beams which are transmitted by the output coupler and/or by the rear mirror.

The laser preferably further comprises a multiplier for multiplying the third signal output by the detector by a first signal applied or supplied to the one or more devices for modulating and/or varying the optical length of the laser or resonator cavity, the multiplier being arranged to output a fourth signal.

The laser preferably further comprises a low-pass filter for low-pass filtering the fourth signal or averaging means for averaging the fourth signal. The output from the low-pass filter or the averaging means preferably comprises an error signal which is arranged to be applied or supplied to the one or more devices in order to vary the optical length of the laser or resonator cavity.

The laser preferably comprises one or more active or laser rods or active media arranged within the laser or resonator cavity. One, two, three or more than three pairs of quarter-wave plates are preferably arranged within the laser or resonator cavity.

The laser preferably further comprises a polariser arranged within the laser or resonator cavity.

The laser preferably further comprises a Q-switch arranged within the laser or resonator cavity.

According to a particularly preferred embodiment the laser comprises a pulsed laser. However, according to a less preferred embodiment the laser may comprise a continuous wave laser.

According to a particularly preferred embodiment the laser comprises a solid-state laser. However, it is also contemplated that the laser may comprise another form of laser such as a gas laser or liquid laser.

According to a particularly preferred embodiment the laser is operated, in use, in a single longitudinal mode.

According to another aspect of the present invention there is provided a laser comprising:

a laser or resonator cavity comprising an output coupler and a rear mirror;

an active medium located within the laser or resonator cavity;

an etalon located within the laser or resonator cavity;

one or more devices for modulating and/or varying the optical length of the laser or resonator cavity;

modulation signal generating means for generating a modulation signal which is supplied or applied, in use, to the one or more devices in order to modulate the optical length of the laser or resonator cavity; and error signal generating means for generating an error signal which is supplied or applied, in use, to the one or more devices in order to vary the optical length of the laser or resonator cavity.

The error signal generating means preferably comprises signal multiplying means for multiplying the modulation signal with a signal representative of or indicative of the energy of laser radiation within the laser or resonator cavity, wherein the signal multiplying means is arranged to output a product signal.

The error signal generating means preferably further comprises low pass filtering means for low pass filtering the product signal or an averaging means for averaging the product signal.

The output of the low pass filtering means or the averaging means preferably comprises the error signal.

According to another aspect of the present invention there is provided a holographic printer for printing holograms comprising a laser as described above.

The holographic printer preferably comprises a red, green and blue ("RGB") holographic printer.

The holographic printer preferably comprises a Master Write or Direct Write holographic printer.

According to another aspect of the present invention there is provided a method of stabilising a laser comprising:

providing a laser or resonator cavity with one or more etalons located within the laser or resonator cavity;

providing one or more devices for modulating and/or varying the optical length of the laser or resonator cavity;

applying or supplying a first modulation signal to the one or more devices in order to modulate the optical length of the laser or resonator cavity; and applying or supplying a second error signal to the one or more devices in order to vary the optical length of the laser or resonator cavity.

According to a further aspect of the present invention there is provided a laser comprising:

a laser or resonator cavity;

one or more etalons located within the laser or resonator cavity; and one or more devices for varying the optical length of the laser or resonator cavity;

wherein, in use, the one or more devices are scanned or varied in order to vary the optical length of the laser or resonator cavity and zones of beating are determined, and wherein the one or more devices are arranged to be maintained or operated, in use, so that the laser is maintained or operated in a mode of operation in between two zones of beating.

Preferably, the one or more devices are maintained or operated so as to select or encourage the laser to operate in a single longitudinal mode.

According to an aspect of the present invention there is provided a method of stabilising a laser comprising:

providing a laser or resonator cavity with one or more etalons located within the laser or resonator cavity; and providing one or more devices for varying the optical length of the laser or resonator cavity;

scanning or varying the one or more devices in order to vary the optical length of the laser or resonator cavity;

determining zones of beating; and maintaining or operating the one or more devices so that the laser is maintained or operated in a mode of operation in between two zones of beating.

Preferably, the one or more devices are maintained or operated so as to select or encourage the laser to operate in a single longitudinal mode.

The step of scanning or varying the one or more devices preferably comprises scanning or varying the one or more devices in a linear or a substantially linear manner.

The step of scanning or varying the one or more devices preferably comprises scanning or varying the one or more devices in a non-linear or a substantially non-linear manner.

Preferably, in a zone of beating the difference between the energy of the laser for two successive energy measurements across a Free Spectral Range is relatively high.

Preferably, when the laser is operating in a single longitudinal mode the difference between the energy of the laser for two successive energy measurements across a Free Spectral Range is relatively low.

According to a further aspect of the present invention there is provided a laser comprising:

a laser or resonator cavity;

one or more etalons located within the laser or resonator cavity; and one or more devices for modulating and/or varying the temperature of one or more optical components or devices disposed within or adjacent to the laser or resonator cavity;

wherein, in use, a first modulation signal and a second error signal are applied or supplied to the one or more devices in order to modulate and/or vary the temperature of the one or more optical components or devices disposed within or adjacent to the laser or resonator cavity.

According to another aspect of the present invention there is provided a method of stabilising a laser comprising:

providing a laser or resonator cavity with one or more etalons located within the laser or resonator cavity;

providing one or more devices for modulating and/or varying the temperature of one or more optical components or devices disposed within or adjacent to the laser or resonator cavity;

applying or supplying a first modulation signal to the one or more devices in order to modulate the temperature of the one or more optical components or devices disposed within or adjacent to the laser or resonator cavity; and applying or supplying a second error signal to the one or more devices in order to vary the temperature of the one or more optical components or devices disposed within or adjacent to the laser or resonator cavity.

BRIEF DESCRIPTION OF THE DRAWINGS

Various embodiments of the present invention will now be described, by way of example only, and with reference to the accompanying drawings in which:

FIG. 3 shows a laser or resonator cavity according to a preferred embodiment;

FIG. 4 shows an analog stabilisation system according to an embodiment of the present invention;

DESCRIPTION OF THE PREFERRED EMBODIMENTS

Figure 1A:
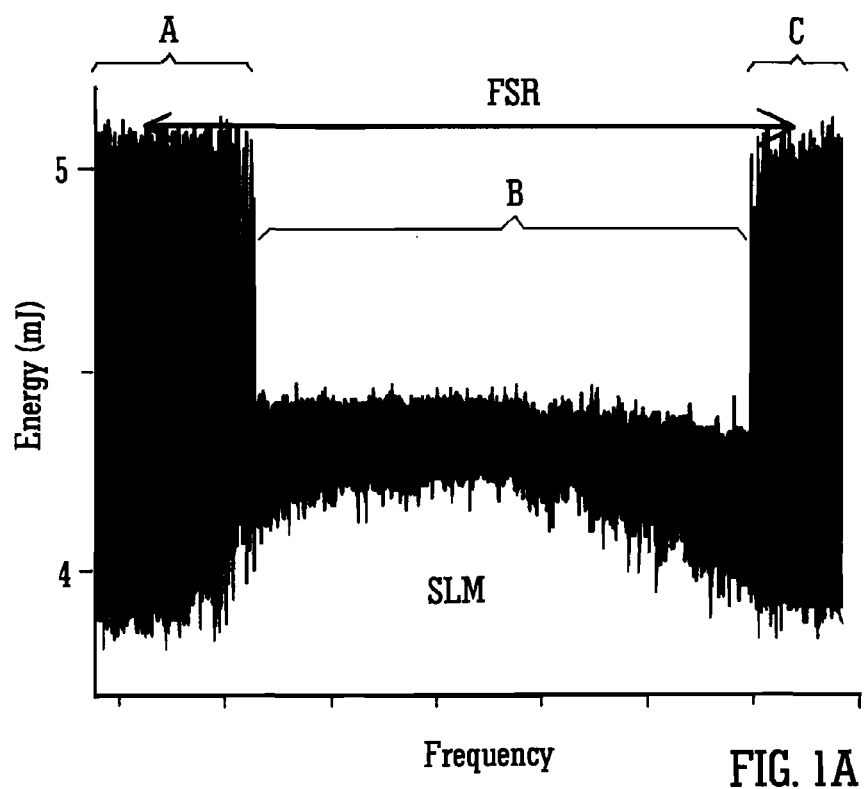
FIG. 1A shows how the pulse energy of a laser may vary as a function of the relative frequency of the laser radiation relative to the resonance frequency of the etalon and FIG. 1B shows how the etalon transmission varies as a function of the relative frequency.

A laser according to a preferred embodiment is shown in FIG. 3. The laser preferably comprises an active rod 1 or other active or lasing media generally disposed between an output coupler 2 and a rear mirror 3. An intra-cavity etalon 4 is preferably arranged adjacent to the active rod 1 and is preferably provided between the output coupler 2 and the active rod 1. According to less preferred embodiments the etalon 4 may be located in a different position within the laser or resonator cavity formed by the output coupler 2 and the rear mirror 3.

First and second quarter-wave plates 5,6 are preferably provided either side of the etalon 4 and active rod 1. The first and second quarter-wave plates 5,6 are preferably provided in order to reduce spatial hole-burning and to prevent back reflection from the etalon 4.

A Q-switch 7 or other similar device is preferably provided between the output coupler 2 and the first quarter-wave plate 5 although according to other embodiments the Q-switch 7 may be provided elsewhere within the laser or resonator cavity. A polarizer 8 is preferably provided between the second quarter-wave plate 6 and the rear mirror 3 although less preferably the polariser 8 may be located elsewhere within the laser or resonator cavity. The polariser 8 is preferably provided to select one linear polarization.

Figure 3A:
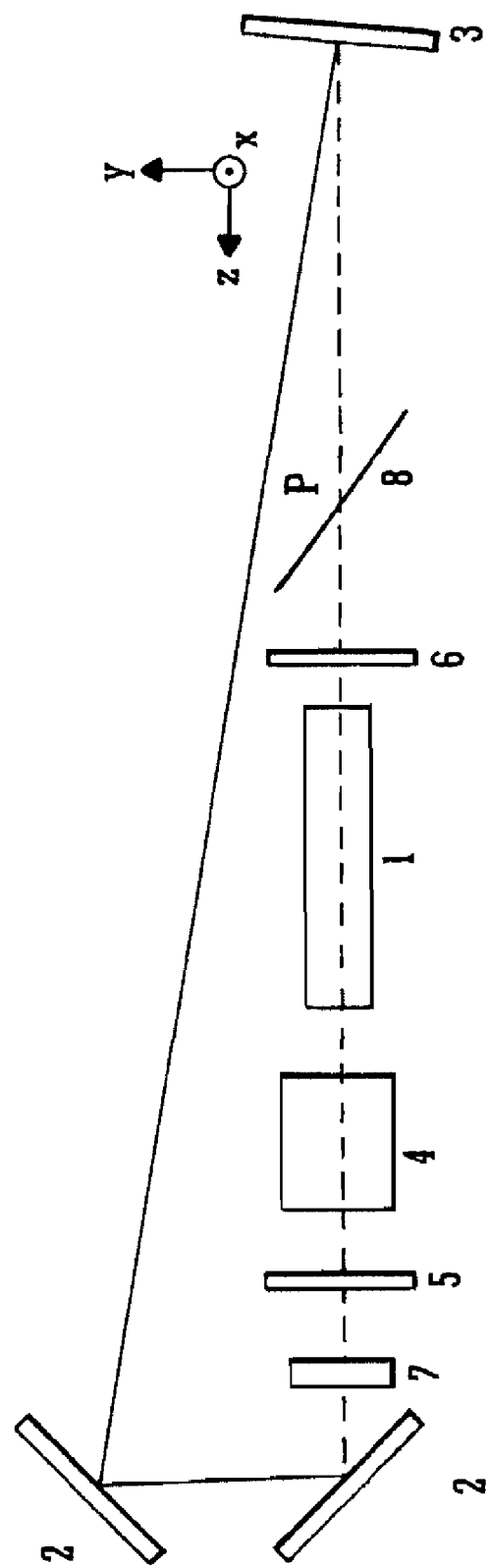
FIG. 3a shows a ring resonator cavity according to an alternate embodiment.

According to a further embodiment two or more pairs of quarter-wave plates may be provided within the laser or resonator cavity. FIG. 3a shows a ring resonator cavity according to an alternate embodiment.

The intra-cavity etalon 4 is preferably used to select or encourage the laser to operate in a single longitudinal mode. Accordingly, a change in the pulse energy will be observed as and when the laser becomes detuned with respect to the resonance frequency of the intra-cavity etalon 4. This is illustrated in FIG. 1A. In the central region B of the graph shown in FIG. 1A the laser is at resonance in a SLM mode of operation and the pulse energy is maximal. As the laser undergoes a drift of its operating mode with respect to the resonance frequency of the etalon 4, the pulse energy will become reduced. If the laser drifts sufficiently or substantially far from resonance of the etalon 4 then the laser will then switch from operating in a single longitudinal mode and will instead operate in a dual mode of operation wherein two longitudinal modes will begin to oscillate simultaneously. The dual longitudinal mode of operation is shown in regions A and C of FIG. 1A.

Figure 1B:
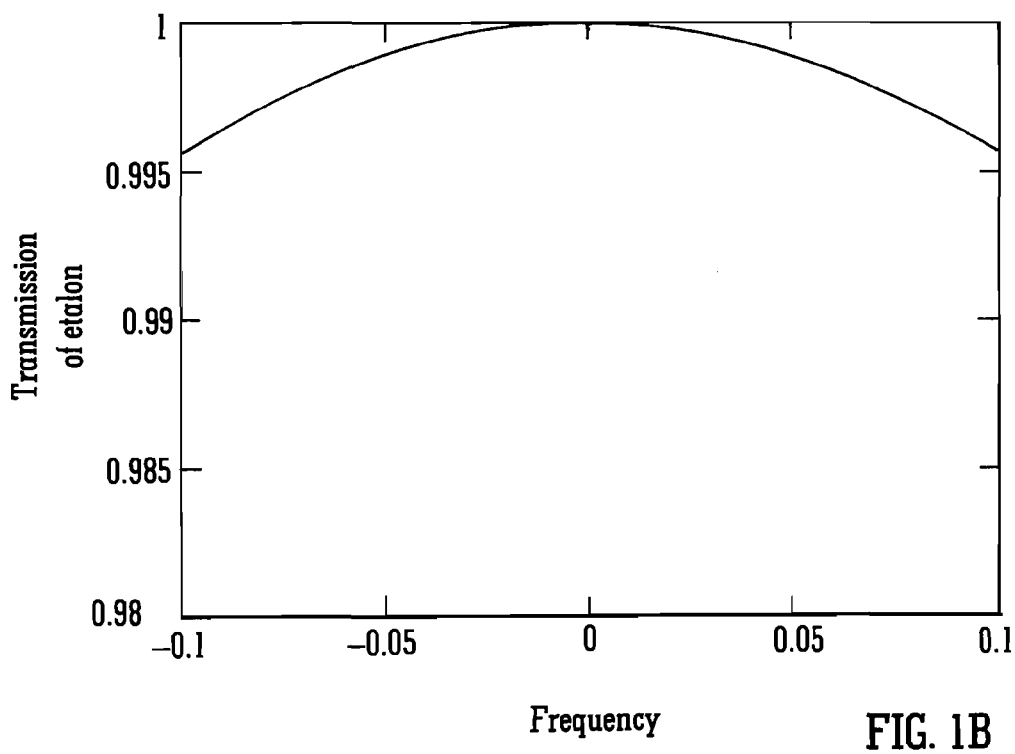
Figure 2A:
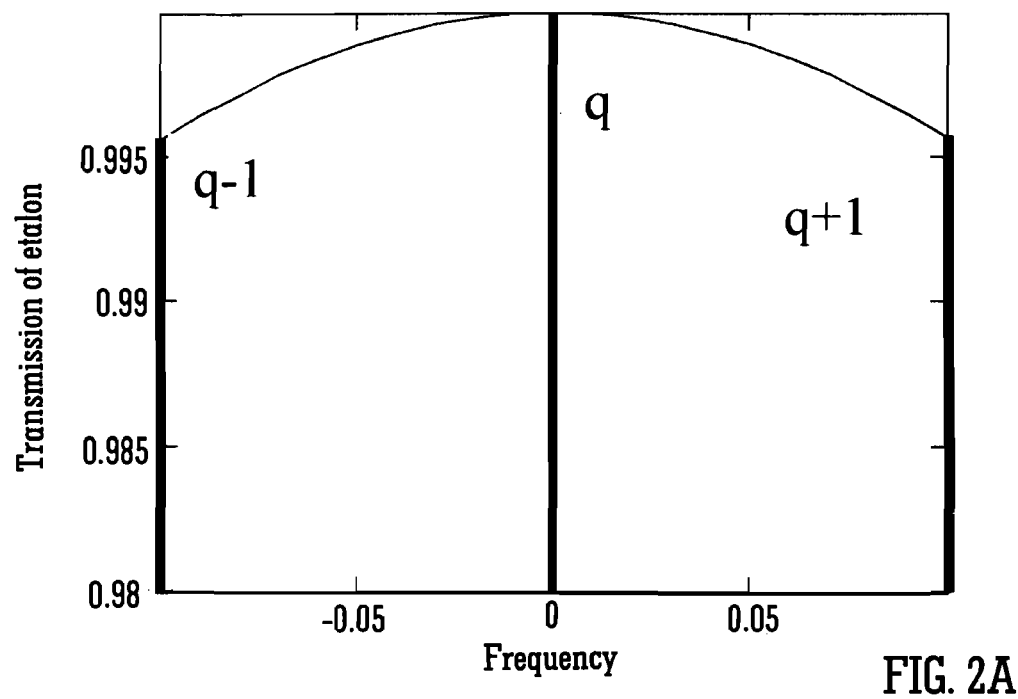
FIG. 2A shows the transmission of an etalon for different frequencies of longitudinal modes when a laser is operating in SLM and FIG. 2B shows the transmission of the etalon for two different frequencies when the laser is simultaneously operating in two different longitudinal modes.
Figure 2B:
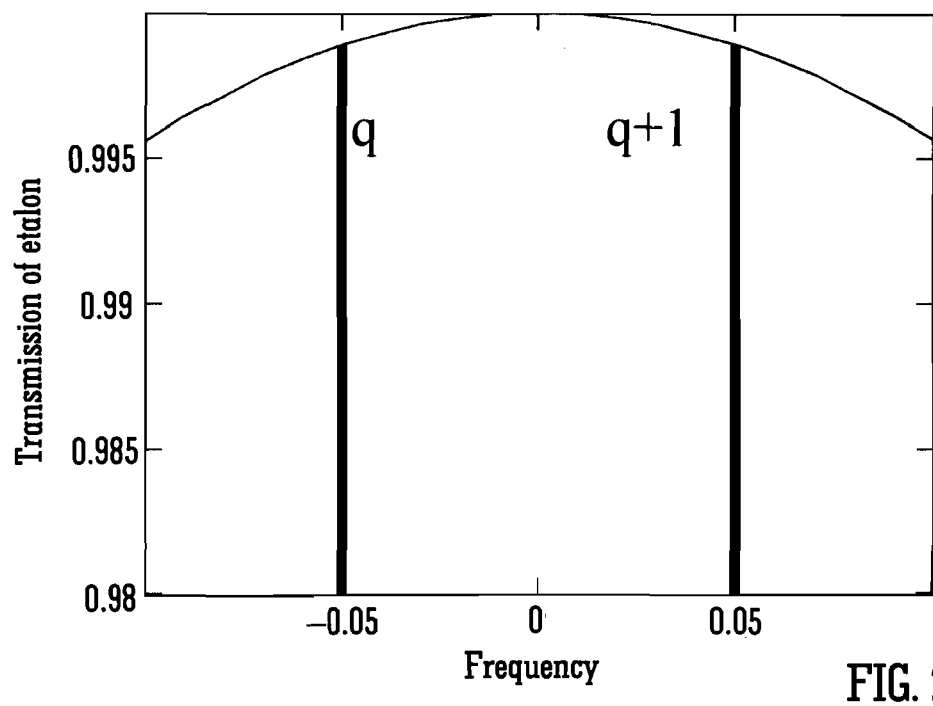

FIG. 1B shows the transmission of an intra-cavity etalon 4 as a function of frequency relative to the resonance frequency of the etalon 4. In FIGS. 1A and 1B the pulse energy and the etalon transmission are shown over one full Free Spectral Range (FSR). As will be appreciated by those skilled in the art, the pulse energy as shown in FIG. 1A will be periodical in FSR i.e. it will reproduce itself with a period FSR.

In order to correct for any drift of the laser a feedback signal is preferably provided wherein a error signal is preferably generated. According to the preferred embodiment the optical length of the laser cavity is preferably modulated. The length of the optical cavity is preferably modulated by mounting one of the mirrors of the laser cavity on a piezo-electric transducer or other device which is then preferably modulated by an applied voltage. However, according to other arrangements the laser may be modulated in other ways. For example, the temperature of the active rod 1 could be modulated.

Although the length of the optical cavity is preferably modulated, a method of stabilizing the pulse energy of a laser by modulating the temperature of the laser cooling water will first be described.

The water temperature as a function of time may be described by:

$$\theta_w(t) = \frac{\Delta\theta_w}{2}\sin(\Omega t) + \theta_0 \quad (1)$$

wherein $\Delta\theta_w$ is the peak-peak amplitude of the temperature modulation, $\Omega$ is its angular frequency and $\theta_0$ is the central temperature at which the water is maintained.

The modulation of the water temperature will induce a modulation of the laser detuning with respect to the etalon 4 as follows:

$$\delta(t) = \frac{\Delta\delta}{2}\sin(\Omega t - \psi) + \delta_e \quad (2)$$

wherein $\Delta\delta$ is the peak-peak amplitude of the detuning modulation, $\psi$ is the phase-shift due to the delay between the water temperature and the actual detuning and $\delta_e$ is the detuning error.

The peak-peak amplitude of the detuning is proportional to the peak-peak amplitude of the temperature modulation:

$$\Delta\delta = C \times \Delta\theta_w \quad (3)$$

wherein C is a proportionality factor between temperature and detuning.

From FIGS. 1A and 1B the energy of the laser as a function of detuning whilst operating in SLM may be approximated by a parabola:

$$E(t) = E_m\left\{1 - \left(\frac{\delta(t)}{\Delta}\right)^2\right\} \quad (4)$$

wherein $E_m$ is the maximum energy and $\Delta$ is the free spectral range of the resonator.

Inserting equation (2) into equation (4) and multiplying E(t) with the phase-shifted modulated part of equation (1) gives:

$$E(t) \times \theta_w(t, \varphi) = \quad (5)$$

$$E_m \times \left[1 - \frac{\delta_e^2 + \Delta\delta \times \delta_e \times \sin(\Omega t - \psi)}{\Delta^2} - \left(\frac{\Delta\delta}{2\Delta}\right)^2 \sin^2(\Omega t - \psi)\right] \times$$

$$\frac{\Delta\theta_w}{2}\sin(\Omega t - \varphi)$$

wherein $\varphi$ is the phase shift applied to the modulated part of equation (1).

In order to generate an error signal, equation (5) may be averaged over one full period of the modulation thereby yielding:

$$\langle E(t) \times \theta_w(t, \varphi)\rangle = -\frac{E_m \times \Delta\theta_w \times \Delta\delta \times \delta_e}{2\Delta^2} \times \langle \sin(\Omega t - \Psi) \times \sin(\Omega t - \varphi)\rangle \quad (6)$$

This enables the following equation to be obtained:

$$\langle E(t) \times \theta_w(t, \varphi)\rangle = -\frac{E_m \times C \times \Delta\theta_w^2}{2\Delta^2} \times \cos(\varphi - \psi) \times \delta_e \quad (7)$$

Consequently, calculating $\langle E(t) \times \theta_w(t,\phi)\rangle$ enables an error signal to be calculated which can then be fed back into $\theta_0$ i.e. the central value of the temperature modulation. Due to a delay between the temperature setting and the actual detuning, oscillations of the feedback loop may be encountered. However, this can be addressed by feeding back the error signal through an appropriate scale factor.

By way of example, if $\Delta$ is 180 MHz, $E_m$ is 5 mJ, C is 590 MHz.K$^{-1}$ and $\Delta\theta_w$ is 0.1 K, then assuming that $\cos(\phi-\psi)$ is adjusted to 1, and for a typical remaining oscillation of $\langle E(t) \times \theta_w(t,\phi)\rangle$ of 0.002, a typical remaining oscillation of the detuning as low as 4.4 MHz may be obtained. According to equation (4) the peak-peak modulation of 0.1 K on the temperature will result in an energy modulation of about 2.7%.

According to the preferred embodiment, however, the water temperature is preferably kept constant and the length of the laser cavity is preferably effectively modulated by using one or more piezo-electric transducers or devices which are preferably attached either to the output coupler 2 and/or to the rear mirror 3 of the laser or resonator cavity.

An advantage of observing or monitoring the laser frequency is that in practice the transfer function from control voltage to actual laser frequency is not generally linear. Consequently, spurious offset components can appear with modulation. Modulating the laser frequency preferably prevents this from occurring.

According to the preferred embodiment no attempt is preferably made to stabilise the absolute frequency of the laser. Instead, the laser frequency is preferably stabilised relative to the resonance frequency of the etalon 4. According to the preferred embodiment the resonator or laser cavity length is preferably modulated. The modulation signal applied to the laser or resonator cavity is preferably multiplied by a signal indicative of the energy measured at an output of the laser. The modulation component is then preferably removed by averaging or low pass filtering. An error signal is then preferably generated which is then preferably additionally applied to the laser or resonator cavity. The one or more piezo-electric transducers or devices attached to either the output coupler 2 and/or to the rear mirror 3 of the laser or resonator cavity are therefore also arranged to receive the error signal and in response thereto are additionally varied such that they cause the optical length of the laser or resonator cavity to be varied.

FIG. 4 shows an embodiment of the present invention wherein an analogue system is used to stabilise the laser or resonator cavity. Energy within the laser cavity is preferably measured by a detector 9 or other device arranged to detect one or more beams output or otherwise transmitted by the rear mirror 3. One or more piezo-ceramic or piezo-electric devices or transducers 10 is preferably attached to or otherwise arranged so as to translate, move, vibrate or vary the relative positions of the output coupler 2 and/or the rear mirror 3. The one or more piezo-electric devices 10 is preferably modulated with a sine or other function or other voltage waveform. The detected signal and the signal supplied to the one or more piezo-electric devices 10 or other devices are preferably multiplied together or otherwise modulated or combined together. The product or combination of these two signals is then preferably low-pass filtered or otherwise averaged so as to remove the AC or modulation component of the combined signal. A lock-in amplifier may, for example, be used for this purpose.

According to a particularly preferred embodiment the laser which is stabilised is preferably pulsed. Consequently, the detector 9 may not necessarily provide a DC output. Instead an electronic circuit or other device may be used to measure the energy of each pulse detected by the detector 9 and to then generate a preferably proportional analog voltage or signal which is then preferably output to a computer or microprocessor.

According to a particularly preferred embodiment a computer or microprocessor may be used to generate the sine wave or other preferably regularly varying voltage waveform which is preferably applied to the one or more piezo-electric ceramics, transducers or other devices 10 as a modulation signal. The computer or microprocessor may also handle the various signal processing stages including signal multiplication and signal averaging to produce a filtering effect and to produce the resultant error signal. The computer or microprocessor may also be arranged so as to add or otherwise sum the generated error signal to or with the modulation signal and apply both signals to the one or more piezo-electric or other devices 10 which are preferably used to vary the optical length of the laser cavity.

In the particular embodiment shown in FIG. 4 a lock-in amplifier is used to perform many of the functions required to provide both the modulation signal and the error signal. However, according to an alternative embodiment a computer or microprocessor may be used to perform these processes i.e. the signal generation and processing steps may be performed digitally.

Figure 5A:
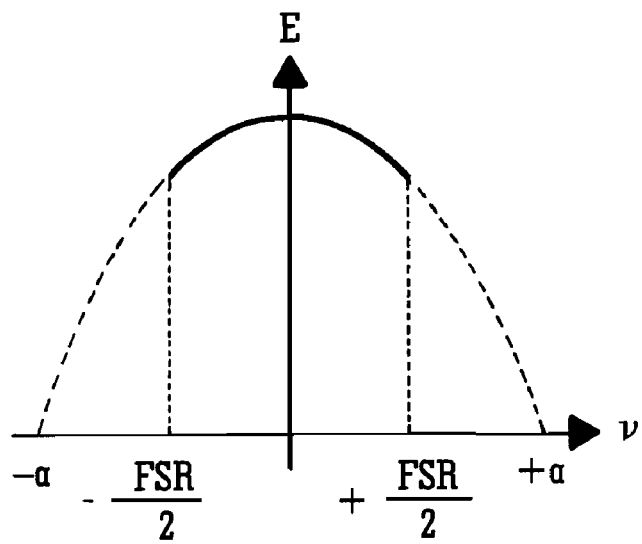
FIG. 5A shows in schematic form an arch in the pulse energy which is observed when modulating the laser frequency around a central frequency and FIG. 5B illustrates an alternative approach to stabilising the laser.

When the laser frequency is scanned relative to the resonance frequency of the etalon 4 the power output is seen to respond with an arch-like profile with respect to frequency. Such arches are preferably obtained or observed every Free Spectral Range (FSR). A single arch is shown, for example, in FIG. 5A. The shape of the arch can be defined by a first parameter a and the FSR. Both parameters can be obtained empirically from piezo scans i.e. scanning the optical length of the laser cavity with respect to the resonance frequency of the etalon 4.

The arches can preferably be represented by a second-order polynomial:

$$E = E_{max} \times \left[1 - \left(\frac{v}{a}\right)^2\right] \quad (8)$$

wherein $E_{max}$ is preferably the maximum of the sample averages rather that the all-point maximum.

The frequency modulation can therefore be rendered as:

$$v(t) = \Delta v_c + \frac{v_a}{2}\sin\Omega t \quad (9)$$

wherein v(t) is the central frequency of modulation with respect to the laser mode center and $v_a$ is the peak-to-peak amplitude.

To extract the preferred error signal the energy is preferably multiplied by the modulation sine function:

$$E \times \sin\Omega t = E_{max} \times \left[1 - \left(\frac{\Delta v_c + \frac{v_a}{2}\sin\Omega t}{a}\right)^2\right] \times \sin\Omega t \quad (10)$$

The above equation may then be expanded. It is also convenient to normalize by the maximum energy:

$$\frac{E \times \sin\Omega t}{E_{max}} = \left[1 - \left(\frac{\Delta v_c}{a}\right)^2\right] \times \sin\Omega t - \frac{v_a \times \Delta v_c}{a} \times \sin^2\Omega t - \left(\frac{v_a}{2a}\right)^2 \times \sin^3\Omega t \quad (11)$$

After averaging over one full period $$\left(\frac{2\pi}{\Omega}\right),$$

the odd terms disappear:

$$\left\langle \frac{E \times \sin\Omega t}{E_{max}} \right\rangle = -\frac{v_a \times \Delta v_c}{2a} \quad (12)$$

Finally, the error frequency can be extracted:

$$\Delta v_c = -\frac{2a}{v_a} \times \left\langle \frac{E \times \sin\Omega t}{E_{max}} \right\rangle \quad (13)$$

For adjustment purposes a gain G may be introduced. The frequency shift to be applied can then be represented as:

$$\delta v_c = G \times \frac{2a}{v_a} \times \left\langle \frac{E \times \sin\Omega t}{E_{max}} \right\rangle \quad (14)$$

The frequency correction is then preferably converted into a voltage which is then preferably applied to the one or more piezo-electric ceramic or piezo-electric devices 10. The one or more piezo-electric or piezo-ceramic or other device 10 is preferably driven by an amplifier whose gain is preferably known. This conversion may be handled by a computer or microprocessor.

In the method described above the error signal applied to the laser or laser cavity is preferably refreshed every modulation period. However, according to other embodiments the error signal may be refreshed more (or less) often e.g. N times per period. In this case, since the applied signal is cumulated to previous error signals, it should be divided by N. This approach can enable a more rapid reaction of the system to perturbation and therefore can enhance the performance of the laser.

Particularly preferred aspects of the present invention include the fact that the signal processing may be performed digitally, that the relative laser frequency is preferably stabilized as opposed to the absolute frequency and that the laser is pulsed.

An important advantage of the preferred embodiment is that the reference (i.e. the etalon frequency) effectively already forms part of the laser. As a result additional external or internal optical devices such as saturable absorber cells or reference passive Fabry-Perot (FP) cavities are not required. The preferred laser is therefore significantly simpler and less expensive in design than conventional laser systems whilst also being more effective in stabilising the laser energy so that it preferably continue to operate in SLM.

An alternative less preferred embodiment is contemplated wherein an alternative technique for stabilising the laser is employed. According to this embodiment the laser frequency may be scanned or otherwise varied linearly. Zones of beating may then be detected and the laser may be tuned exactly in between and away from these zones. If the laser is used as part of a holographic printer arrangement then during a print run, the stabilisation step may be performed, for example, every 10 minutes.

Figure 6A:
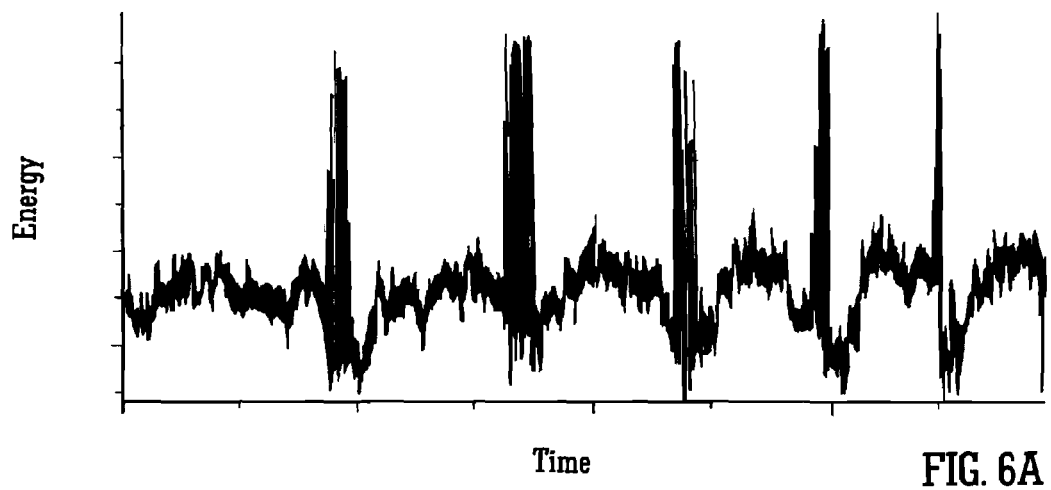
FIG. 6A shows the energy of a laser according to an alternative embodiment wherein a voltage scan is performed.
Figure 6B:
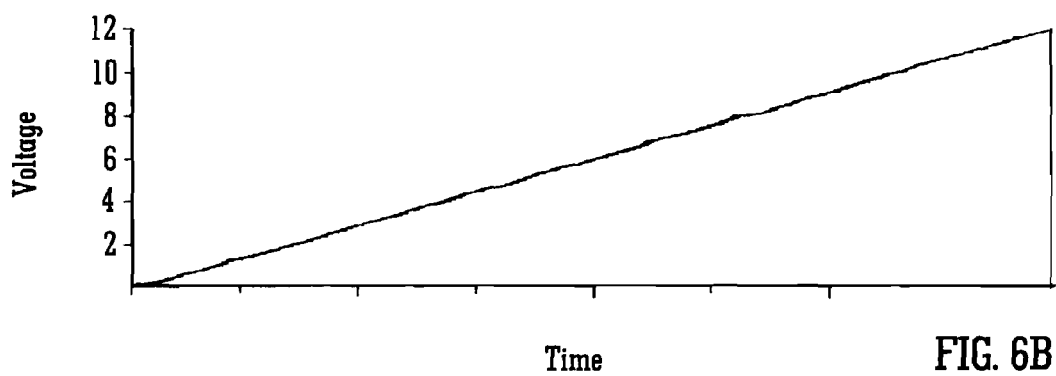
FIG. 6B shows the voltage applied to an amplifier the output from which is fed to a piezo-electric transducer attached to the output coupler of the laser resonator cavity and FIG. 6C shows the absolute value of the difference between two successive energy points.
Figure 6C:
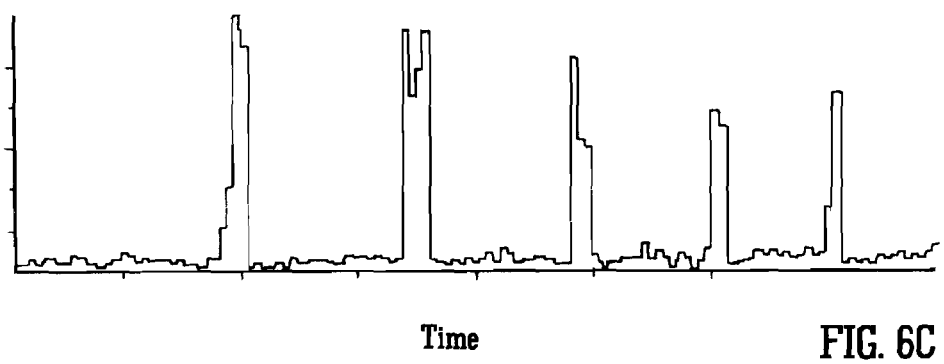

The principle behind the alternative less preferred embodiment is illustrated by FIGS. 6A-6C. A voltage scan is performed by shifting linearly the piezo-electric transducer or piezo-ceramic device attached to either the output coupler 2 or the rear mirror 3. FIG. 6A shows the energy of a laser according to the alternative embodiment when a voltage scan is performed, FIG. 6B shows the voltage applied to an amplifier the output from which is fed to a piezo-electric transducer attached to the output coupler of the laser resonator cavity and FIG. 6C shows the absolute value of the difference between two successive energy points.

FIGS. 6A-6C illustrate five or six Free Spectral Ranges. As will be understood by those skilled in the art, with reference to FIG. 6C the beating zones result in relatively high values for the difference between two successive energy points whilst when the laser is operating in single longitudinal mode any difference is relatively low. According to the alternative less preferred embodiment the laser is preferably maintained or operated substantially in the middle between two zones of beating.

According to an embodiment a laser, especially a laser used in a holographic printer, may be initially stabilized according to the less preferred alternative embodiment as described above with reference to FIGS. 6A-6C and then the laser may switch to use the preferred method of stabilization using a modulation technique as described above with reference to FIGS. 3-5.

According to the preferred embodiment once the stabilization is locked then the laser is usable all the time. However, according to the alternative less preferred embodiment the laser may not be usable during the scanning process. It is however contemplated that the laser could switch between the two different stabilisation regimes or could for certain periods of time use both forms of stabilisation concurrently.

Further embodiments are contemplated wherein digital filtering e.g. Kalman filtering related to the modulation may be used. Temperature sensors may also be used to anticipate or monitor the laser behavior.

According to a further embodiment an alternative or complementary way of stabilizing the laser frequency using a modulation will be described with reference to FIG. 5B. According to the preferred embodiment described above when the frequency of the laser is modulated sinusoidally an error signal may be obtained after one full period which may, for example, be approximately every 30 s. However, according to the alternative or complementary embodiment, an error signal may be generated more often, for example approximately every 1 s. An average may preferably be applied to filter out noise or unwanted components.

According to the alternative or complementary embodiment the same expression may be used to describe the energy of the laser with respect to the etalon resonance frequency:

$$E = E_{max} \times \left[1 - \left(\frac{v}{a}\right)^2\right] \quad (15)$$

Figure 5B:
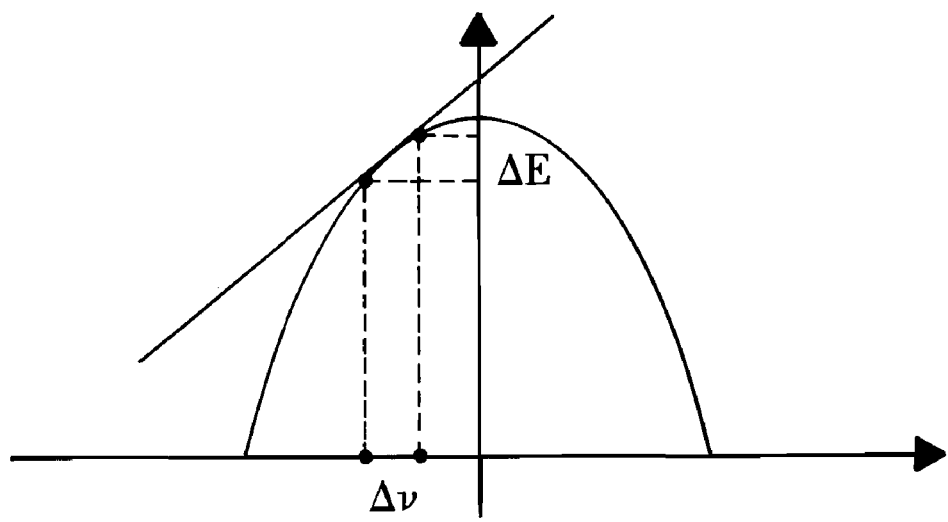

As shown in FIG. 5B the slope is given by:

$$\frac{\Delta E}{\Delta v} = -\frac{2E_{max}}{a^2} \times v \quad (16)$$

It will be appreciated that parameter a and $E_{max}$ may or will be known if a frequency scan has initially been performed. The slope may preferably be measured using a least-square linear fitting method. Accordingly, the detuning parameter $\delta$ can be readily determined.

This alternative or complementary method is particularly suitable for detecting rapid frequency shifts on the time scale of seconds in contrast to the preferred embodiment which is most responsive to changes over a slightly longer time scale of say a few minutes. During this period any rapid change in laser frequency can be filtered out by the averaging. According to the alternative or complementary embodiment a rapid change can be detected and a correction can be applied equally quickly.

Whilst the preferred embodiment relates to modulating the length of the optical cavity and a less preferred embodiment has been described wherein the temperature of the laser cooling water is modulated, it is also contemplated that the temperature of the etalon or any other optical device or optical component within the laser or resonator cavity may be modulated in an analogous manner to the manner described above in relation to the preferred embodiment.

Finally, it is also contemplated that alternative methods or means of modulating the laser or resonator cavity may be used. For example, a photorefractive material, electro-optic or other material whose refractive index may be varied, modulated or externally changed may be used to vary and/or modulate the optical length of the laser or resonator cavity. This will vary the eigen frequency of the mode and can be used for modulation.

Although the present invention has been described with reference to preferred embodiments, it will be understood by those skilled in the art that various changes in form and detail may be made without departing from the scope of the invention as set forth in the accompanying claims.

What is claimed is:

1. A laser comprising:
   a resonator cavity;
   one or more etalons located within the resonator cavity; and
   one or more devices configured to modulate and/or vary the optical length of the resonator cavity;
   wherein a modulation signal and an error signal related to the modulation signal multiplied with a signal representative of an energy of the laser are supplied to the one or more devices in order to modulate and/or vary the optical length of the resonator cavity.

2. A laser as claimed in claim 1, further comprising signal generating means configured to generate the modulation signal, wherein the modulation signal is supplied to the one or more devices in order to modulate the optical length of the resonator cavity.

3. A laser as claimed in claim 2, wherein the signal generating means comprises an AC or RF voltage source or voltage wave generator.

4. A laser as claimed in claim 1 further comprising an error signal generating means configured to generate the error signal, wherein the error signal is supplied to the one or more devices in order to vary the optical length of the resonator cavity.

5. A laser as claimed in claim 1, wherein the one or more etalons are configured to select a single longitudinal mode of the laser.

6. A laser as claimed in claim 1, wherein the resonator cavity comprises a linear resonator cavity.

7. A laser as claimed in claim 1, wherein the resonator cavity comprises a ring resonator cavity.

8. A laser as claimed in claim 1, wherein the laser comprises at least one output coupler.

9. A laser as claimed in claim 8, wherein at least one of the one or more devices is arranged to translate, modulate or vary the at least one output coupler.

10. A laser as claimed in claim 1, wherein the laser comprises at least one rear mirror.

11. A laser as claimed in claim 10, wherein at least one of the one or more devices is arranged to translate, modulate or vary the at least one rear mirror.

12. A laser as claimed in claim 1, wherein the one or more devices comprises one of: i) one or more piezo-electric transducers or devices, and ii) one or more piezo-ceramic transducers or devices.

13. A laser as claimed in claim 1, further comprising a detector configured to detect or determine the energy of laser radiation within the resonator cavity and output a detected signal.

14. A laser as claimed in claim 13 further comprising an output coupler and/or a rear mirror, wherein the detector is to detect one or more beams which are transmitted by the output coupler and/or rear mirror.

15. A laser as claimed in claim 13, further comprising a multiplier configured to multiply the detected signal by a first signal supplied to the one or more devices to output a combined signal.

16. A laser as claimed in claim 15, further comprising a low-pass filter for low-pass filtering the combined signal or averaging means for averaging the combined signal.

17. A laser as claimed in claim 16, wherein the output from the low-pass filter or the averaging means comprises the error signal which is supplied to the one or more devices in order to vary the optical length of the resonator cavity.

18. A laser as claimed in claim 1, further comprising one or more active or laser rods or active media arranged within the resonator cavity.

19. A laser as claimed in claim 1, further comprising a pair of quarter-wave plates arranged within the resonator cavity.

20. A laser as claimed in claim 1, further comprising a polariser arranged within the resonator cavity.

21. A laser as claimed in claim 1, further comprising a Q-switch arranged within the resonator cavity.

22. A laser as claimed in claim 1, wherein the laser comprises a continuous wave laser.

23. A laser as claimed in claim 1, wherein the laser comprises a solid-state laser.

24. A laser as claimed in claim 1, wherein the laser is operated, in use, in a single longitudinal mode.

25. A laser comprising:
a resonator cavity comprising an output coupler and a rear mirror;
an active medium located within the resonator cavity;
an etalon located within the resonator cavity;
one or more devices configured to modulate and/or vary the optical length of the resonator cavity;
modulation signal generating means configured to generate a modulation signal which is supplied to the one or more devices in order to modulate the optical length of the resonator cavity; and
error signal generating means comprising signal multiplying means for multiplying the modulation signal with a signal representative of the energy of laser radiation with the resonator cavity, the error signal generating means configured to generate an error signal which is supplied to the one or more devices in order to vary the optical length of the resonator cavity.

26. A laser as claimed in claim 25, wherein the signal multiplying means is configured to output a product signal.

27. A laser as claimed in claim 26, wherein the error signal generating means further comprises low pass filtering means configured to low pass filter the product signal or an averaging means configured to average the product signal.

28. A laser as claimed in claim 27, wherein the output of the low pass filtering means or the averaging means comprises the error signal.

29. A holographic printer for printing holograms comprising a laser as claimed in claim 1.

30. A holographic printer as claimed in claim 29, wherein the holographic printer comprises a red, green and blue ("RGB") holographic printer.

31. A holographic printer as claimed in claim 29, wherein the holographic printer comprises a Master Write or Direct Write holographic printer.

32. A method of stabilising a laser comprising:
providing a resonator cavity with one or more etalons located within the resonator cavity;
providing one or more devices for modulating and/or varying the optical length of the resonator cavity;
supplying a modulation signal to the one or more devices in order to modulate the optical length of the laser or resonator cavity; and
supplying a error signal that relates to the modulation signal multiplied with a signal representative of an energy of the laser to the one or more devices in order to vary the optical length of laser or resonator cavity.

33. A laser comprising:
a resonator cavity;
one or more etalons located within the resonator cavity; and
one or more devices configured to vary the optical length of the resonator cavity;
wherein the one or more devices are scanned or varied in order to vary the optical length of the resonator cavity and zones of beating are determined, and wherein the one or more devices are arranged to be maintained or operated so that the laser is maintained or operated in a mode of operation in between two zones of beating.

34. A laser as claimed in claim 33, wherein the one or more devices are maintained or operated so as to select the laser to operate in a single longitudinal mode.

35. A method of stabilising a laser comprising:
providing a resonator cavity with one or more etalons located within the resonator cavity; and
providing one or more devices for varying the optical length of the resonator cavity;
scanning or varying the one or more devices in order to vary the optical length of the resonator cavity;
determining zones of beating; and maintaining or operating the one or more devices so that the laser is maintained or operated in a mode of operation in between two zones of beating.

36. A method as claimed in claim 35, wherein the one or more devices are maintained or operated so as to select the laser to operate in a single longitudinal mode.

37. A method as claimed in claim 35, wherein the step of scanning or varying the one or more devices comprises scanning or varying the one or more devices in a linear or a substantially linear manner.

38. A laser comprising:
a resonator cavity;
one or more etalons located within the resonator cavity; and
one or more devices configured to modulate and/or vary the temperature of one or more optical components or devices disposed within or adjacent to the resonator cavity;
wherein a modulation signal and a error signal that relates to the modulation signal multiplied with a signal representative of an energy of the laser are supplied to the one or more devices in order to modulate and/or vary the temperature of the one or more optical components or devices.

39. A method of stabilising a laser comprising:
providing a resonator cavity of the laser with one or more etalons located within the resonator cavity;
providing one or more devices for modulating and/or varying the temperature of one or more optical components or devices disposed within or adjacent to the resonator cavity;
supplying a modulation signal to the one or more devices in order to modulate the temperature of the one or more optical components or devices disposed within or adjacent to the resonator cavity; and
supplying an error signal that relates to the modulation signal multiplied with a signal representative of an energy of the laser to the one or more devices in order to vary the temperature of the one or more optical components or devices.

* * * * *